United States Patent [19]

Kodera et al.

[11] Patent Number: 4,667,195
[45] Date of Patent: May 19, 1987

[54] REAR MONITOR SYSTEM TRIGGERED BY OCCUPANT LEAVING THE VEHICLE

[75] Inventors: Masao Kodera, Okazaki; Kunihiko Sasaki, Aichi, both of Japan

[73] Assignee: Nippon Soken, Inc., Nishio, Japan

[21] Appl. No.: 603,733

[22] Filed: Apr. 25, 1984

[30] Foreign Application Priority Data

Apr. 26, 1983 [JP] Japan ................................. 58-74681
Oct. 26, 1983 [JP] Japan ................................. 58-201327

[51] Int. Cl.$^4$ ......................... G01S 13/00; G01S 15/00
[52] U.S. Cl. .................................. 340/901; 340/903; 340/904; 180/281
[58] Field of Search ..................... 340/904, 903, 901; 180/281, 289, 167, 169, 343; 342/27, 70; 367/909; 116/28 R; 455/99

[56] References Cited

U.S. PATENT DOCUMENTS 3,703,714 11/1972 Andrews ............................. 180/289
3,789,950 2/1974 Strenglein .......................... 340/904
4,260,980 4/1981 Bates .................................. 340/904
4,467,313 8/1984 Yoshino et al. ..................... 340/904
4,528,563 7/1985 Takeuchi ............................ 340/904

FOREIGN PATENT DOCUMENTS 52-93490 8/1977 Japan .
54-29446 3/1979 Japan .

Primary Examiner—John W. Caldwell, Sr.
Assistant Examiner—Mahmoud Fatahi-yar
Attorney, Agent, or Firm—Cushman, Darby & Cushman

[57] ABSTRACT

A rear monitor system for an automotive vehicle comprises a sensor secured to a vehicle door located on one side of the vehicle and adapted to be operated by a vehicle occupant when leaving the vehicle, the sensor generating a signal indicating that the occupant is going to leave the vehicle. A control unit is responsive to the signal from the sensor for transmitting radiant energy in a rearward direction to detect a reflection from an object approaching the vehicle from behind at a speed higher than a predetermined value. Further provided is a safety device which is responsive to the detected reflection for preventing the vehicle occupant from opening the door.

8 Claims, 11 Drawing Figures

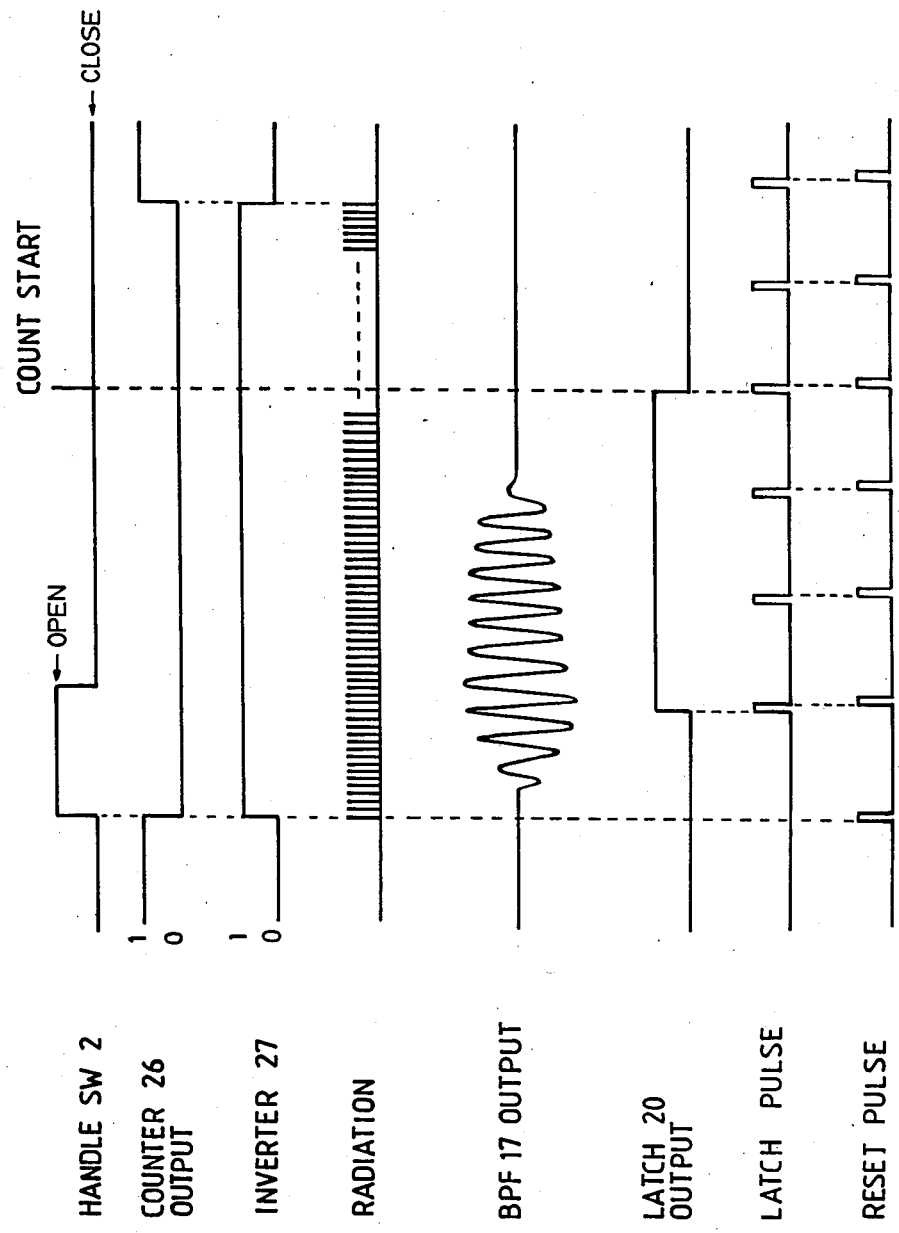

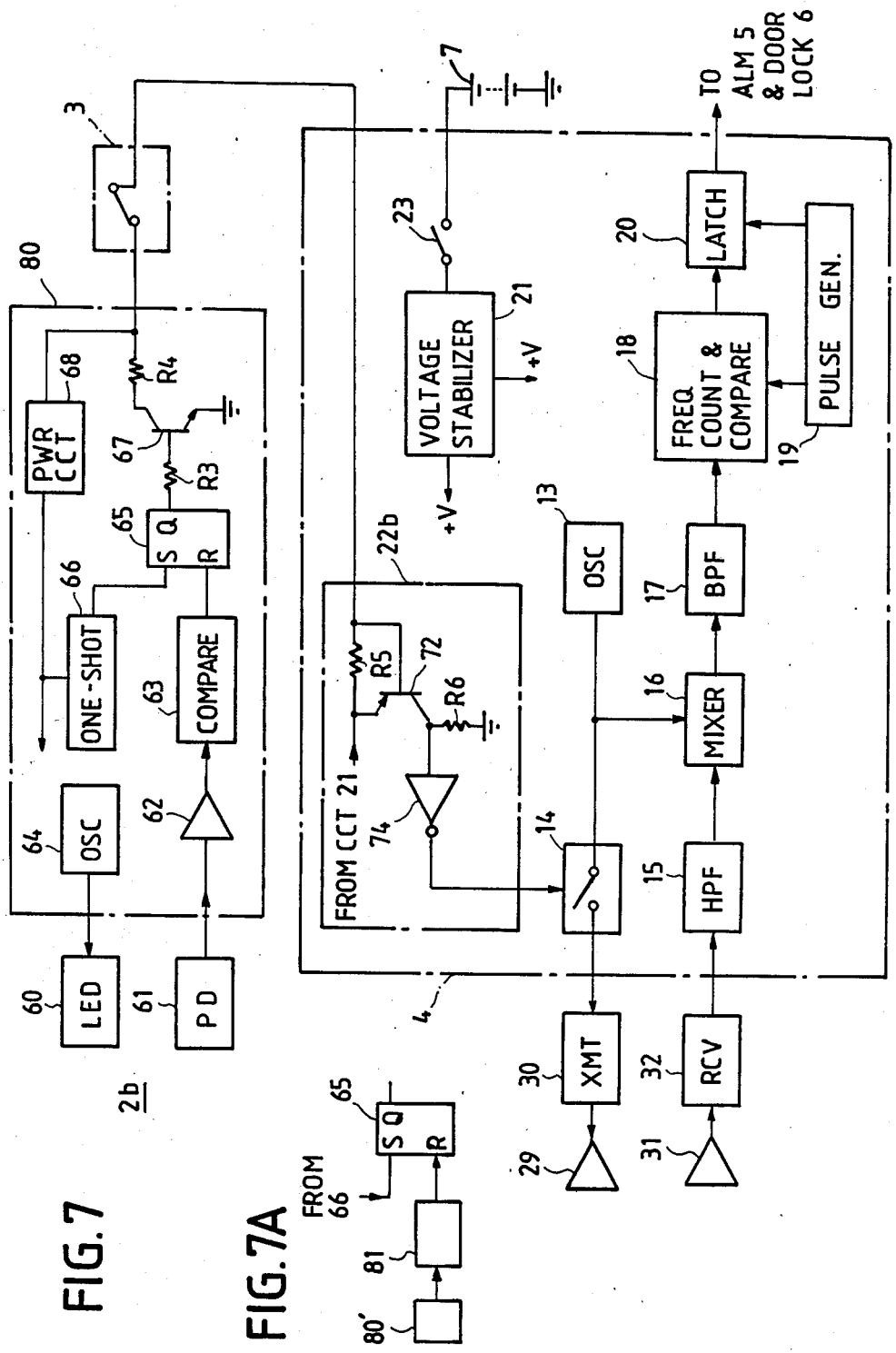

REAR MONITOR SYSTEM TRIGGERED BY OCCUPANT LEAVING THE VEHICLE

BACKGROUND OF THE INVENTION

The present invention relates to a rear monitor system for automotive vehicles for the avoidance of a serious accident by preventing a vehicle occupant from opening a door when a rear vehicle is approaching.

A rear monitor system as shown and described in Japanese Laid-Open Patent Specification No. 54-29446 includes a seat position switch which is operated in response to a vehicle occupant being seated in position for activating a control circuit to detect if the vehicle is at rest. A rear-side radar is triggered upon the detection of such condition to transmit a radar beam in a rearward direction to detect the presence of a car approaching from behind on an adjacent lane and alert the occupant and/or lock a vehicle door.

One disadvantage of this type of systems is that the system is activated whenever the vehicle is stopped. Power is thus wasted during such periods when vehicles are merely awaiting a traffic light to turn green.

SUMMARY OF THE INVENTION

Accordingly, an object of the present invention is to provide a rear monitor system for an automotive vehicle which eliminates useless operation of the system and power consumption to a minimum.

This object is achieved by an arrangement which triggers the system into operation exclusively at times when a vehicle occupant is about to leave the vehicle.

A rear monitor system according to the invention comprises first means secured to a vehicle door located on one side of the vehicle and adapted to be operated by a vehicle occupant when leaving the vehicle for generating a signal indicating that the occupant is going to leave the vehicle. A second means is provided which is responsive to the signal from the first means for transmitting radiant energy in a rearward direction and detecting a reflection from an object approaching the vehicle from behind at a speed higher than a predetermined value. Further provided is a third means which is responsive to the detected reflection for preventing the vehicle occupant from opening the door.

BRIEF DESCRIPTION OF THE DRAWINGS

The present invention will be described in further detail with reference to the accompanying drawings, in which:

FIG. 5 is a waveform diagram useful for describing the operation of the FIG. 1 embodiment;

FIG. 7 is an illustration of a block diagram of a further modification of the present invention and FIG. 7A is an illustration of a portion of FIG. 7 which is replaced with a contact sensor.

DETAILED DESCRIPTION

Figure 1:
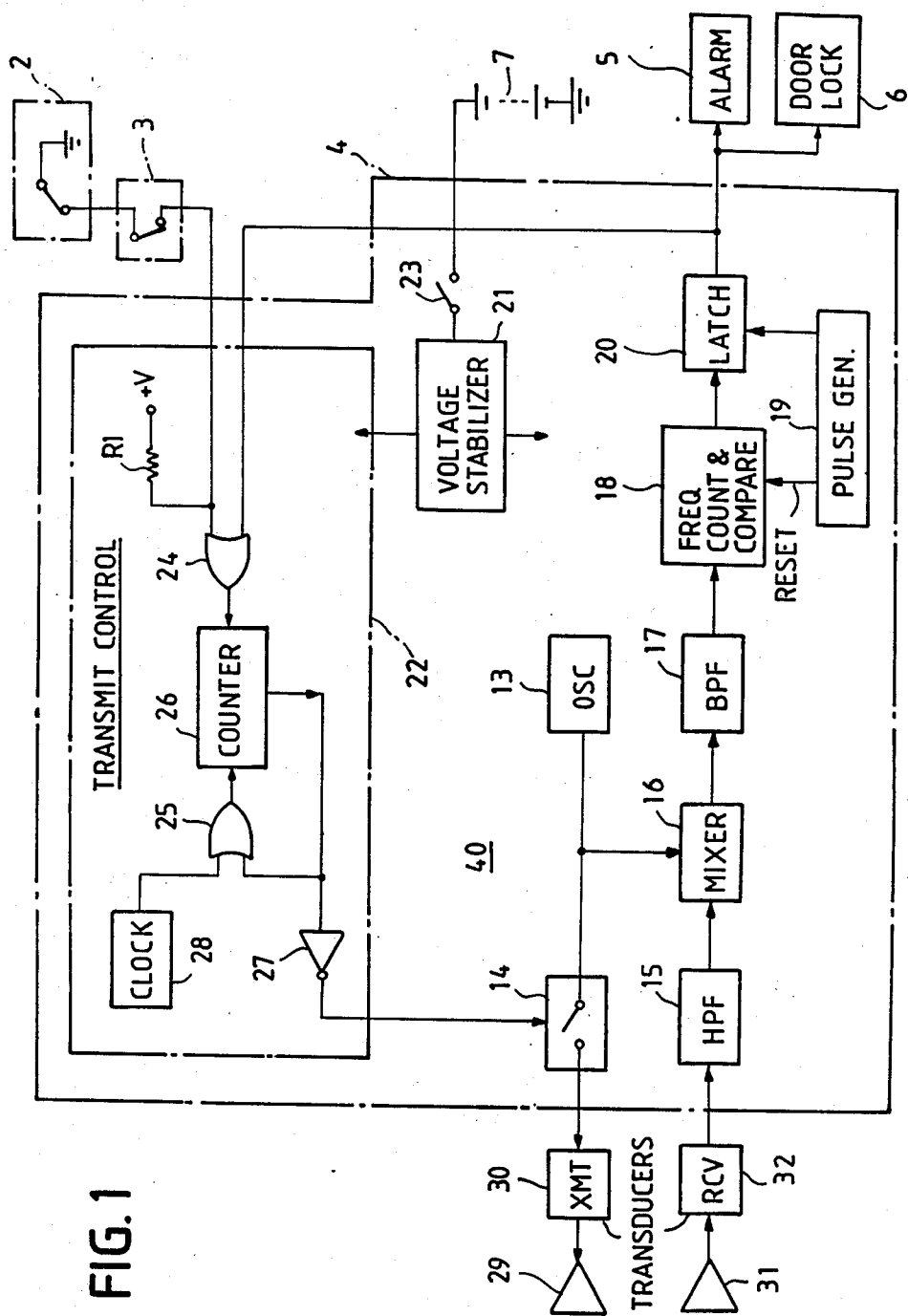
FIG. 1 is an illustration of a block diagram according to an embodiment of the invention.

Referring to FIG. 1, there is shown an embodiment of the present invention, which generally comprises a door handle switch 2 which is a door-handle operation detector, a signal coupler 3 and a signal processing circuit 4. The processing circuit 4 includes a transmit control circuit 22 which is responsive to a ground potential applied thereto via coupler 3 to generate a beam emission command signal to a Doppler circuit generally indicated by numeral 40.

Figure 2:
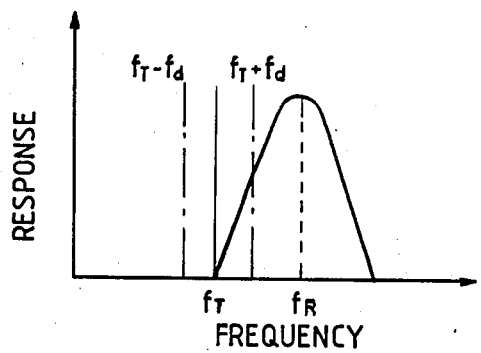
FIG. 2 is an illustration of a frequency response characteristic of a receiving transducer of FIG. 1.

Doppler circuit 40 comprises an oscillator 13 and an analog switch 14 through which ultrasonic-frequency continuous wave signal generated by oscillator 13 is supplied to an acoustic transducer 30 which is coupled to an acoustic beam transmission antenna 29 located at one corner of the rear of an automobile. A reception antenna 31 is located adjacent the transmission antenna to pick up acoustic reflections from vehicles coming from behind and feeds a receiving transducer 32 for conversion to electrical signals. The transducer 32 has a peak sensitivity at a frequency $f_R$ higher than the frequency $f_T$ of the transmitted acoustic energy as shown at FIG. 2. Due to the Doppler effect on the transmitted beam, reflections from a vehicle coming from behind occur at closer intervals than the transmitted waves so that it is possible to discriminate such reflections from those returning from receding vehicles.

The output of transducer 32 is applied to a high-pass filter 15 having a cut-off frequency corresponding to frequency $f_T$. Reflections from rear oncoming vehicles are represented by a signal having a frequency $f_T+fd$ where fd is a Doppler displacement which is indicative of the speed of a moving object, whereas reflections from receding vehicles are represented by a signal having a frequency $f_T-fd$. High-pass filter 15 allows a signal having a frequency higher than $f_T$ to pass to a mixer 16 to which the oscillator signal is also applied. A band-pass filter 17 is provided to pass a beat component which is the difference between the frequencies of the inputs to the mixer to detect the Doppler displacement fd.

A frequency count and comparing circuit 18 provides a count of the waves in the Doppler component that occur within a predetermined interval and compares it with a reference value which corresponds to a vehicle speed typically 10 km/h. If the count value is greater than the reference, a logical one output is generated and stored into a latch 20. A pulse generator 19 is provided for resetting the frequency count and latching the logical one output at regular intervals. The output of latch 20 is connected to an audible alarm 5 and a door lock mechanism 6.

All the circuitry in the unit 4 are powered by a voltage stabilizer 21 which is connected to a battery 7 by a seat position switch 23 to stabilize the operating voltage against battery voltage variations.

Transmit control circuit 22 includes a counter 26 which provides a count of clock pulses from clock 28 through OR gate 25 and places a logical one to another input of OR gate 25 and an inverter 27 when the count reaches a predetermined value. An OR gate 24, whose one input is biased by a resistor R1 to +V, receives ground potential from door-handle switch 2 via signal coupler 3 and the output of latch 20. Counter 26 is reset to zero count in the presence of a logical one at the output of OR gate 24 to switch the counter output to a logical zero, causing a logical one output from inverter 27 to close the switch 14, and reinitiates counting operation when the output of OR gate 24 switches to logical zero.

Figure 3A:
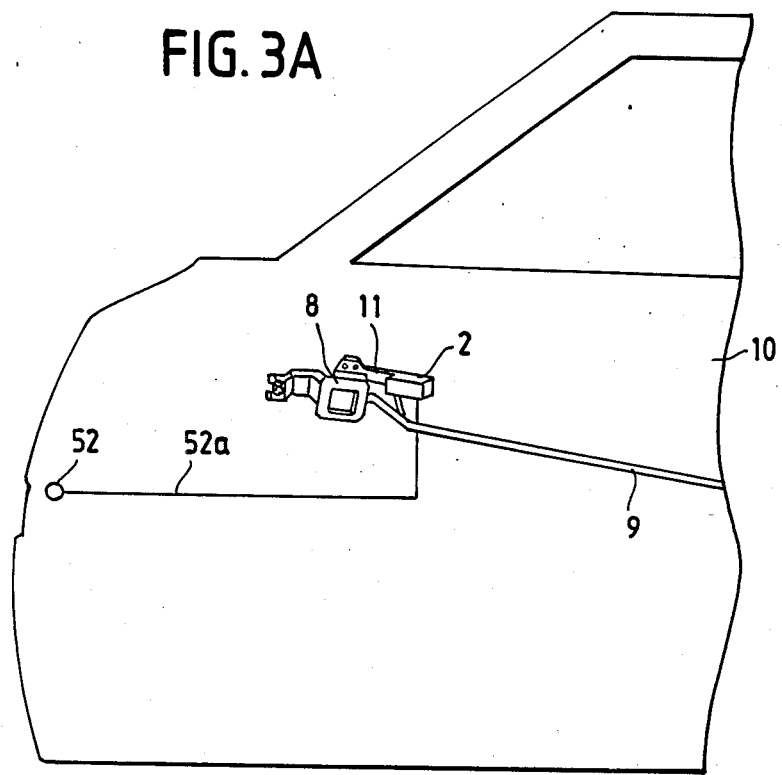
FIGS. 3A and 3B are illustrations of details of the door handle operation detector of FIG. 1.
Figure 3B:
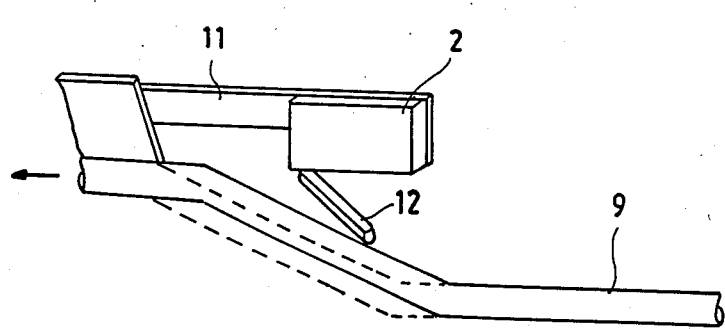

Before describing the operation of the FIG. 1 embodiment, reference is made to FIGS. 3A, 3B, 4A and 4B where details of door handle switch 2 and signal coupler 3 are illustrated. In FIGS. 3A and 3B, door handle switch 2 comprises a microswitch which is mounted on a fixture 11 fitted to a door 10 and includes a finger arm 12 contacting a linkage 9. Linkage 9 is operatively connected to a door handle 8 so that it moves in the direction of arrow as indicated in FIG. 3B when the door handle is pulled away from the door 10 and microswitch 2 disconnects the circuit to the door switch 3. The finger arm 12 is positioned so that microswitch 2 is opened when door handle 8 is rotated a small angle which is insufficient to trigger the linkage unlocking the door.

Figure 4A:
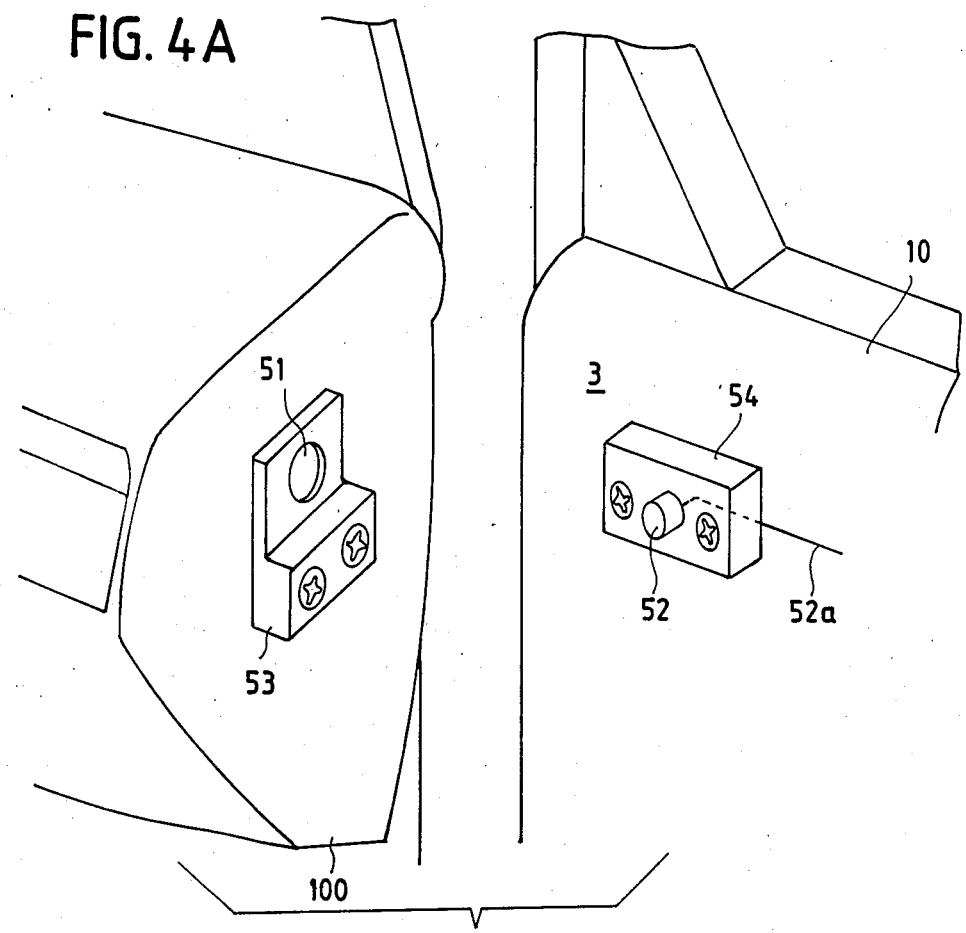
FIGS. 4A and 4B are illustrations of details of the signal coupling means of FIG. 1.
Figure 4B:
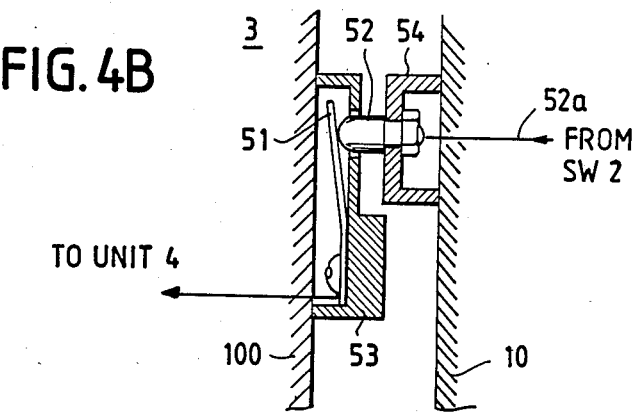

Signal coupler 3, shown in FIGS. 4A and 4B, includes a metal contact 52 connected to the microswitch 2 via a lead 52a and secured to the door 10 by a resin-molded mount 54, and a spring contact 51 secured in a resin-molded mount 53 to a side wall of the instrument panel 100. When door 10 is closed, contacts 51 and 52 establish an electrical connection between switch 2 until the door is fully opened.

The operation of the FIG. 1 embodiment will now be described with reference to FIG. 5.

When a vehicle occupant is seated, seat position switch 23 is operated to power the circuitry 4. With door 10 being closed, a ground potential is applied through switch 2 and coupler 3 to OR gate 24 as a logical zero.

When the door handle is turned a small angle by the occupant desiring to leave the vehicle, linkage 9 is moved in the direction of arrow in FIG. 4B and microswitch 2 is opened. Under this condition, door 10 is not opened and coupler 3 establishes electrical connection between its contacts 51 and 52. A logical one is applied through resistor R1 to OR gate 24 and resets the counter 26 to zero, causing a logical zero output from counter 26 to be inverted by inverter 27, providing a control signal to switch 14. A circuit is established between oscillator 13 and transducer 30 and a beam of ultrasonic energy is transmitted from antenna 29 rearwardly of the vehicle so that acoustic reflection occurs when the beam is intercepted by a vehicle passing through a specified area.

If there is no vehicle coming from behind along the adjacent lane, the alarm 5 is not sounded and door lock 6 not energized. The occupant is allowed to open the door to leave the vehicle. If the transmitted beam is intercepted by a rear vehicle, acoustic reflections at frequency $f_T+f_d$ are sensed by transducer 32 and the Doppler frequency component is detected by mixer 16 and band-pass filter 17 as indicated by a sinusoidal waveform in FIG. 5. Frequency counter 18 is reset in response to a first reset pulse from pulse generator 19 to initiate the counting of waves in the sinusoidal signal until it is reset by the next reset pulse supplied from pulse generator 19. If the vehicle speed is greater than 10 km/h, the Doppler frequency has a substantial value and frequency counter and comparing circuit 18 generates a logical one which is stored into latch 20 in response to a first latch command pulse. Frequency counter and comparing circuit 18 repeats its operation and generates logical-one outputs in succession as long as there is a single or a series of rear vehicles approaching at a speed higher than 10 km/h. Alarm 5 and door lock 6 are energized by the output of latch 20. The occupant is alerted. When he removes his hand from the door handle, handle switch 2 is closed, removing the logical one from OR gate 24. However, the logical-one output of latch 20 holds counter 26 under the reset condition.

In response to the latch 20 switching to logical zero immediately after the termination of the Doppler warning signal, alarm 5 and door lock 6 are deenergized. Counter 26 reinitiates counting the clock pulses and generates a logical one output when the count reaches a predetermined value which corresponds to the amount of time sufficient for vehicle occupants to open a door and leave the vehicle. Door 10 is thus unlocked from the instant the latch 20 output switches to logical zero to the instant a full count is reached in counter 26. Occupant is allowed to open and leave the vehicle during this time period. With the seat position switch 23 being restored, power is disconnected from all the circuit components of the warning system of the invention and rear-vehicle monitoring operation is no longer continued. No power consumption occurs during periods in which warning operation is not required.

Figure 6:
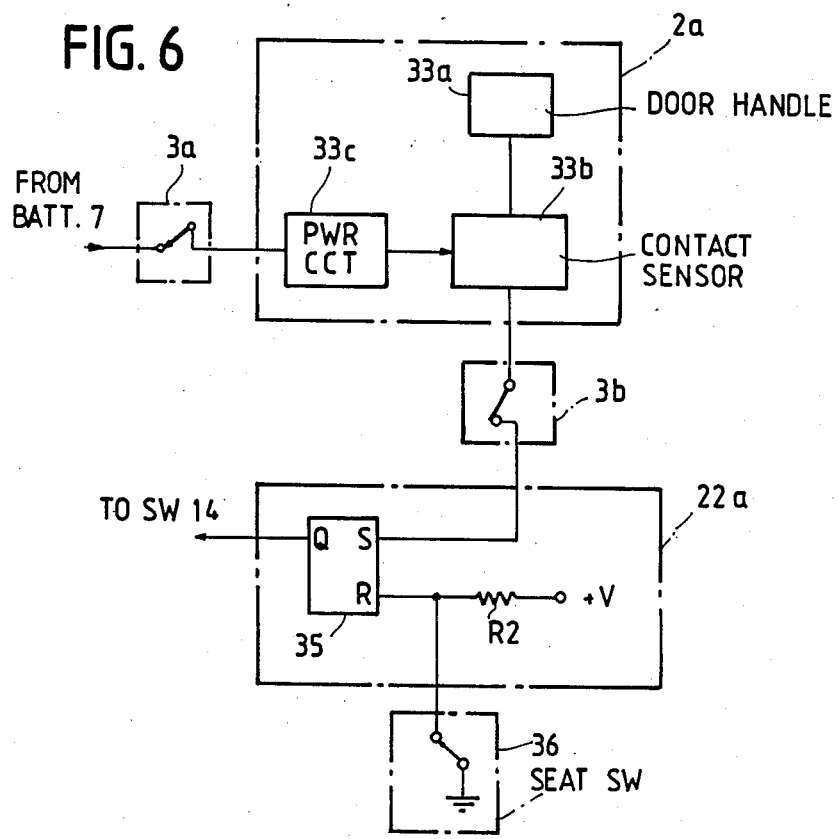
FIG. 6 is an illustration of a modified embodiment of the present invention.

An alternative embodiment of the transmit control circuit 22 and its associated circuit are illustrated in FIG. 6. In this embodiment, door handle switch 2a includes an electrode 33a which may be a conductive film formed on a resin film which is coated on the door handle 8. A contact sensor 33b of a known type is connected to the electrode 33a to detect a voltage change that occurs when the occupant's hand contacts the door handle and generate a logical-one output in response thereto. This contact sensor is supplied with a DC voltage from a power circuit 33c which stabilizes it against variations in voltage supply from battery 7. Connection between power stabilizer circuit 33c and battery 7 is made by a coupler 3a identical in construction to coupler 3.

An emission control circuit 22a includes a flip-flop 35 having a set input coupled to the output of contact sensor 33b via second coupler 3b. The reset input of flip-flop 35, which is normally biased at a potential +V via resistor R2, is coupled to ground by a normally-open seat position switch 36 located beneath a front seat to connect the ground potential to the reset input when the seat is occupied. The output of flip-flop 35 is connected as a switching control signal to analog switch 14.

When, in operation, the occupant touches the door handle, flip-flop 35 is triggered into set condition, establishing a connection between oscillator 13 and transducer 30 in FIG. 1 to transmit acoustic energy rearwards. A logical-one output from latch 20 indicating that there is an approaching rear vehicle, keeps the flip-flop under set condition after the occupant leaves his hand from the door handle. When the occupant leaves his seat, seat position switch 36 is opened, applying a logical one to the reset input of flip-flop 35. Flip-flop 35 is reset and switch 14 is opened, terminating the transmission of the acoustic beam.

Figure 8:
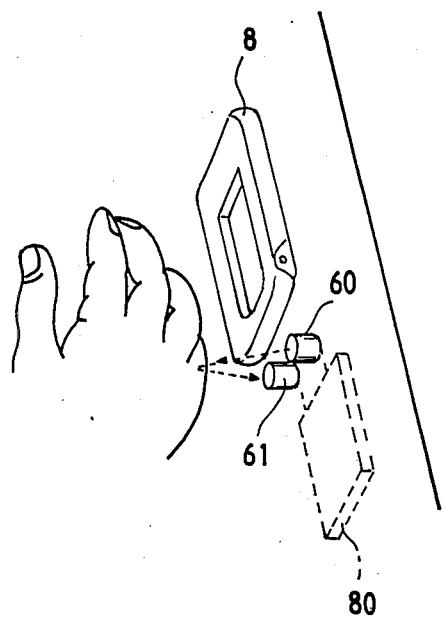
FIG. 8 is an illustration of a door handle operation detector of FIG. 7.

FIG. 7 is an illustration of another modification of the present invention. In this embodiment, the door handle operation detector, shown at 2b, comprises a control module 80, a light-emitting diode 60 driven by an oscillator 64 housed in module 80 to intermittently emit infrared light beam and a photodiode 61 which responds to light reflected from a nearby object. As illustrated in FIG. 8, light-emitting diode 60 and photodiode 61 are mounted on the door 10 in side-by-side relationship. The emitted infrared light beam emitted from diode 60 is reflected from an occupant's hand as it approaches the door handle 8. Signal sensed by photodiode 61 is amplified at 62 and fed to a comparator 63 where it is compared with a reference value to generate a signal when the reference is reached. A flip-flop 65 is triggered into a set condition in response to an output signal from a one-shot multivibrator 66 and reset in response to the output signal from comparator 63. The one-shot multivibrator is triggered when it receives a potential +V from a power circuit 68. This power circuit takes its input through coupler 3 and resistor R5 from the voltage stabilizer 21 and supplies power to all the circuit components of the module 80. The output of flip-flop 65 is coupled by a resistor R3 to the base of a transistor 67 of which the emitter is connected to ground and the collector is connected by a resistor R4 to coupler 3.

The transmit control circuit, shown at 22b, comprises a transistor 72, the collector of which is connected to ground by a resistor R6 and the emitter is connected to the voltage supply terminal of voltage stabilizer 21. The base of transistor 72 is connected through coupler 3 and resistor R4 to the collector of transistor 67. An inverter 74 connects the collector of transistor 72 to switch 14.

The operation of the FIG. 7 embodiment is as follows. When seat position switch 23 is closed, a DC voltage is applied from voltage stabilizer 21 through resistor R5, and coupler 3 to power circuit 68. In response to the application of a voltage from power circuit 68 to one-shot multivibrator 66, flip-flop 65 is set and transistor 67 is turned on. The turn-on of transistor 67 renders transistor 72 conductive and the output of inverter 74 switches to logical zero.

When the occupant's hand is in proximity to photodiode 61, flip-flop 65 is reset in response to an output signal from comparator 63 and transistor 67 is turned off. The turn-off of transistor 67 results in a significant decrease in current flowing through resistors R4 and R5 and turns off transistor 72, causing inverter 74 to switch to logical one to initiate transmission of acoustic beam. Power supply to the module 80 is cut off in response to the opening of switch 23 when the occupant leaves the vehicle.

According to a feature of the FIG. 7 embodiment, a single conductor is used in common as a transmission route for signals from module 80 to transmission control circuit 22b and as a power supply route from stabilizer 23 to module 80.

Alternatively, diodes 60, 61 and circuit elements 62 and 64 can be replaced with an electrode 80 and a contact sensor 81 as shown in FIG. 7A in a manner similar to the FIG. 6 embodiment.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A rear-object monitor system on an automotive vehicle having a door with a lever adapted to be operated by vehicle occupant for exit through the door, comprising:

transmit means for transmitting ultrasonic energy in a rearward direction of the vehicle when said transmit means is enabled;

transmit control means, responsive to an operation of said lever by said vehicle occupant, for enabling said transmit means to transmit said ultrasonic energy for a prescribed duration;

receiving means for receiving an echo returning from an object behind said vehicle as a result of the transmission of said ultrasonic energy, said echo having a frequency variable as a function of the speed of said object relative to said vehicle;

detecting means for generating a door-lock signal when the frequency of said echo exceeds a prescribed value; and door lock means for locking said door in response to said door-lock signal.

2. A rear-object monitor system as claimed in claim 1, wherein said transmit control means includes a contact sensor mounted on said door for generating a trigger signal, gate means responsive to said trigger signal for generating a signal to enable said transmit means, and means for resetting said gate means when the vehicle occupant leaves a seat.

3. A rear-object monitor system as claimed in claim 1, wherein said transmit control means includes a microswitch, a linkage coupling said lever to said microswitch for operating said microswitch when said lever is operated, and counter means for counting clock pulses in response to operation of said microswitch and generating a signal to enable said transmit means for a duration from the initiation of the count until the count reaches a prescribed value.

4. A rear-object monitor system as claimed in claim 1, wherein said transmit control means includes a proximity sensor mounted on said door adjacent said lever for generating a trigger signal, and counter means for counting clock pulses in response to said trigger signal for generating a signal to enable said transmit means for a duration from the initiation of the count until the count reaches a prescribed value.

5. A rear-object monitor system as claimed in claim 4, wherein said proximity sensor includes means for emitting radiant energy, means for receiving a portion of the radiant energy returning from a nearby object and generating a trigger signal, and counter means for counting clock pulses in response to said trigger signal and generating a signal to enable said transmit means for a duration from the initiation of the count until the count reaches a prescribed value.

6. A rear-object monitor system as claimed in claim 1, further comprising alarm means for alerting said vehicle occupant in response to said detecting means.

7. A rear-object monitor system as claimed in claim 1, further comprising timing means operable in response to cessation of said door-lock signal for disabling said transmit means for a prescribed period.

8. A rear-object monitor system as claimed in claim 7, wherein the transmit control means and said timing means comprise:

a clock pulse source for generating a clock pulse; and counter means arranged to be enabled in response to operation of said lever and in response to cessation of said door-lock signal for counting said clock pulse and generating a signal to enable said transmit means for a duration from the initiation of the count until the count reaches a prescribed value.

* * * * *